United States Patent [19]
West et al.

[11] 3,713,378
[45] Jan. 30, 1973

[54] BASTER AND TENDERIZER

[75] Inventors: Dexter F. West; Joseph W. West, both of Oaltewah, Tenn.

[73] Assignee: James Edward Cobb, Chattanooga, Tenn.

[22] Filed: Feb. 18, 1971

[21] Appl. No.: 116,379

[52] U.S. Cl. ................................................99/346
[51] Int. Cl. .............................................A47j 37/00
[58] Field of Search.........................................99/346

[56]  References Cited

UNITED STATES PATENTS

| 1,339,625 | 5/1920 | Holloway | 99/346 |
| 1,719,713 | 7/1929 | Miller | 99/346 |

FOREIGN PATENTS OR APPLICATIONS

| 15,370 | 1895 | Great Britain | 99/346 |
| 48,208 | 8/1909 | Switzerland | 99/346 |
| 48,443 | 6/1909 | Switzerland | 99/346 |
| 185,901 | 8/1936 | Switzerland | 99/346 |

*Primary Examiner*—Edward L. Roberts

[57]  ABSTRACT

A culinary tool for improving the taste of roasting meats and fowl, the device comprising an elongated stem of tubular material which is threaded externally at both ends thereof, the stem being first threadingly secured at one end to a steam pocket plate while the other end of the stem is threadingly engaged to a pointed head or key to permit inserting the stem through a fowl or meat intended to be roasted, after which the key or head is removed and replaced by a basting plate, so that during roasting operation, the steam pocket plate is seated in the gravy at the bottom of the roasting pan and from which the gravy is pushed upwardly through the stem upon the basting plates from which the gravy drips downwardly on top of the fowl or meat so to baste the same and preventing it from drying up, thus producing a tender and tasty food.

1 Claim, 8 Drawing Figures

PATENTED JAN 30 1973 3,713,378
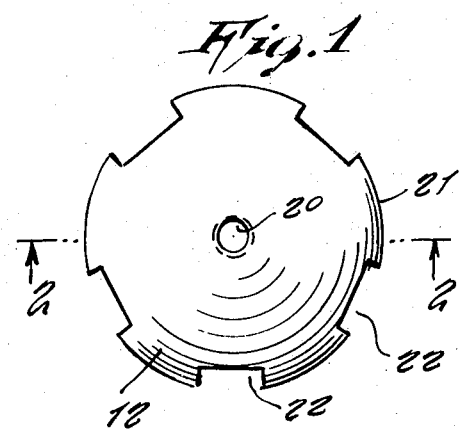
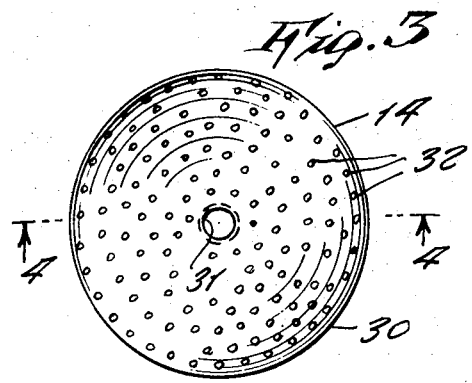
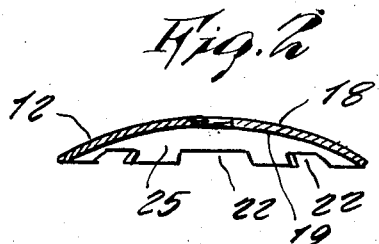
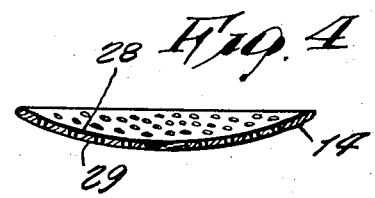
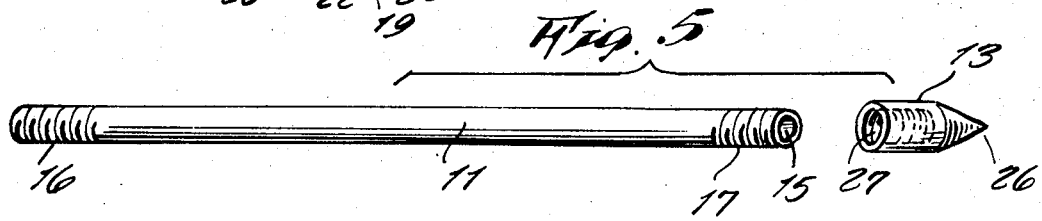
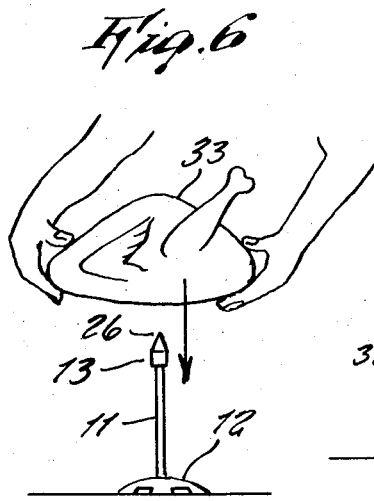
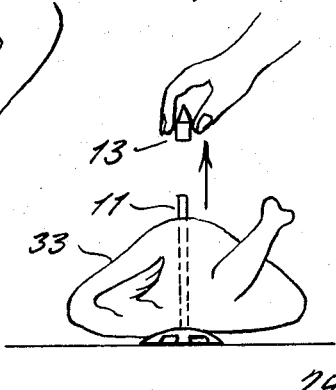
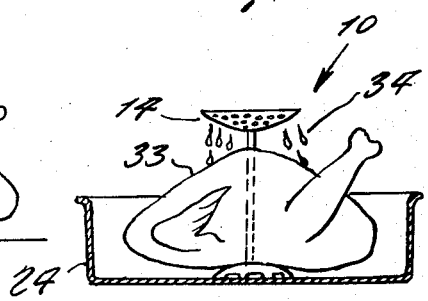
INVENTORS
DEXTER F. WEST
AND
JOSEPH W. WEST

BASTER AND TENDERIZER

This invention relates generally to culinary implements.

It is generally well known to those skilled in culinary art that when a meat or fowl is being roasted, it is necessary to be occasionally basted so that the same will not become dried out and tasteless. Such dried out meat or fowl lacks flavor and can be tough. This situation is, of course, objectionable and in want of improvement.

Accordingly it is the principal purpose of the present invention to provide a baster and tenderizer for basting a meat or fowl in a continuous manner during a roasting operation so that the same will be at the peak of flavor after being cooked.

Another object of the present invention is to provide a baster and tenderizer which is automatically operated without any attention during the cooking operation from the homemaker.

Yet another object of the present invention is to provide a baster and tenderizer which will cut the cooking time of all meats and fowl by approximately one half.

Still another object of the present invention is to provide a baster and tenderizer wherein the gravy formed at the bottom of the pan is circulated above the item being cooked and then is gently dropped downwardly thereupon in a continuous sequence so that the food will not become dried out, thereby retaining the flavor and making it more tasty.

Other objects of the present invention are to provide a baster and tenderizer which is simple in design, inexpensive to manufacture, rugged in construction, easy to use and efficient in operation.

These and other objects will be readily evident upon a study of the following specification and the accompanying drawing wherein:

FIG. 1 is a top plan view of a steam pocket plate which comprises a component of the present invention, FIG. 2 is a side cross-sectional view thereof taken on the line 2—2 of FIG. 1, FIG. 3 is a top plan view of a basting plate which comprises another component of the present invention, FIG. 4 is a side cross-sectional view thereof taken on the line 4—4 of FIG. 3, FIG. 5 is a perspective view of a stem and a head which comprise other components of the present invention, and FIGS. 6, 7 and 8 are side elevation views showing subsequent steps in the use of the present invention.

Referring now to the drawing in detail, the reference numeral 10 represents a baster and tenderizer according to the present invention wherein there are four separate parts that are readily alternately attachable together.

These parts comprise a stem 11 which at one end is removably attachable to a steam pocket plate 12, the opposite end of the stem 11 being alternately attachable either to a pointed head 13 or to a basting plate 14.

The stem 11 comprises a straight elongated tube of metal having a central opening 15 extending therethrough. The opposite ends of the stem are provided with external threads 16 and 17.

The steam pocket plate 12 comprises a circular member that is dished shaped so as to have a convex side 18 and a concave side 19. The steam pocket plate 12 has a central threaded opening 20 for threadingly engaging the threads 16 of the stem 11.

The peripheral edge 21 of the steam pocket plate is provided with a series of notches 22 so to permit gravy to flow under the steam pocket plate when it is placed upon the bottom 23 of a roasting pan 24. Thus a pocket 25 is formed beneath the concave side 19.

The head 13 is tapered at one end to a point 26, the opposite end of the head having a threaded internal opening 27 for being removably attachable over the threaded end 17 of the stem 11.

The basting plate 14 comprises a circular dished member which upon its upper side 28 is downwardly concave and upon its underside 29 is upwardly convex.

The basting plate includes a circular edge 30 and a central threaded opening 31 which can be threadingly engaged to the thread 17 of the stem 11 when the head 13 is first removed therefrom.

A series of small perforated openings 32 are provided throughout the plate so as to permit gravy held upon the concave side of the basting plate to drip downwardly therethrough.

In operative use, as shown in FIGS. 6 through 8, the steam pocket plate 12 is first threadingly engaged to one end of the stem 11, and the head 13 is then attached to the opposite end of the stem.

A piece of roasting meat or a fowl such as a turkey 33, can thus be easily impaled upon the pointed end 36 of the head 13 so that the stem can be inserted through the fowl or meat, as shown in FIG. 7.

The head 13 is then removed and is replaced by the basting plate 14 such as shown in FIG. 8. The turkey 33 is now positioned into a roasting pan 24 with the steam pocket plate resting upon the bottom 23 of the pan.

Gravy collecting on the bottom of the pan can now flow through the notches 22 of the steam pocket plate to the pocket 25 formed there below, the heat from the roasting operation causing the gravy to be forced upwardly through the opening 15 in the stem 11 and depositing the gravy on top of the basting plate from which it gradually drips outwardly through the small openings 32 in the form of gravy drops 34 which now baste the turkey.

Thus an improved culinary tool is provided which will tenderize the meat or fowl and which will improve the flavor thereof while at the same time cutting the baking or roasting operation to approximately one half.

What I now claim is:

1. In a baster and tenderizer, the combination of a culinary tool comprised of four components which are detachably attachable together in selected positions, said components including a steam pocket plate, a basting plate, a stem and a head, said steam pocket plate comprising a circular invertedly dished member which upon its peripheral edge is provided with a series of notches, an upper side of said steam pocket plate being convex while a lower side thereof is concave, said basting plate comprising a downwardly dished member concave upon its upper side with a series of openings therethrough, throughout its entire area, said basting plate like said steam pocket plate having a central threaded opening, said stem comprising an elongated tube with a thread at each end thereof for attachment to said steam pocket plate and basting plate, and said head comprising an internally threaded lock nut for securing over the upper end of said stem and abutting against said basting plate, the upper end of said head being conically pointed for impaling a meat.

* * * * *